US006407913B1

(12) United States Patent
Peachey et al.

(10) Patent No.: US 6,407,913 B1
(45) Date of Patent: Jun. 18, 2002

(54) REMOVABLE CARRIER FOR HARD DISK DRIVE

(75) Inventors: Ezra T. Peachey, San Marcos, CA (US); Stephen R. Brown; Christopher Valentine, both of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/289,084

(22) Filed: Apr. 8, 1999

(51) Int. Cl.[7] .................................................. G06F 1/16
(52) U.S. Cl. ...................... 361/685; 361/684; 361/727; 312/332.1; 312/223.2
(58) Field of Search ...................... 361/679, 683–686, 361/687, 724, 727; 312/294, 298, 300, 322, 323, 325, 327, 332.1, 334.2, 334.1, 223.1, 223.2

(56) References Cited

U.S. PATENT DOCUMENTS

| 5,340,340 A | | 8/1994 | Hastings et al. | ............... 439/64 |
| 5,588,728 A | * | 12/1996 | Eldridge et al. | ......... 312/332.1 |
| 6,058,016 A | * | 5/2000 | Anderson et al. | ........... 361/727 |

* cited by examiner

Primary Examiner—Darren Schuberg
Assistant Examiner—Yean-Hsi Chang
(74) Attorney, Agent, or Firm—Blakely, Sokoloff, Taylor & Zafman LLP

(57) ABSTRACT

Disclosed is a hard disk drive carrier adapted to be housed in a disk drive chassis comprising a drive bay for receiving and holding a hard disk drive; an integrated locking mechanism including a handle for carrying the disk drive carrier and for providing a one-handed locking mechanism for locking and unlocking the disk drive carrier in the disk drive chassis; and an EMI shield fixedly coupled to the drive bay for providing a barrier to electromagnetic interference, the EMI shield covering a portion of the hard disk drive.

Also disclosed is a hard disk drive bay including opposing sidewalls for securing a hard disk drive into a chassis comprising a primary locking mechanism, the primary locking mechanism comprising first and second swing arms each pivotally coupled to said drive bay at a first pivot point and pivotally coupled to a handle at a second pivot point; and a secondary locking mechanism disposed on one or both of said opposing sidewalls, the secondary locking mechanism adapted to interface with corresponding locking elements disposed on the hard drive chassis.

5 Claims, 5 Drawing Sheets

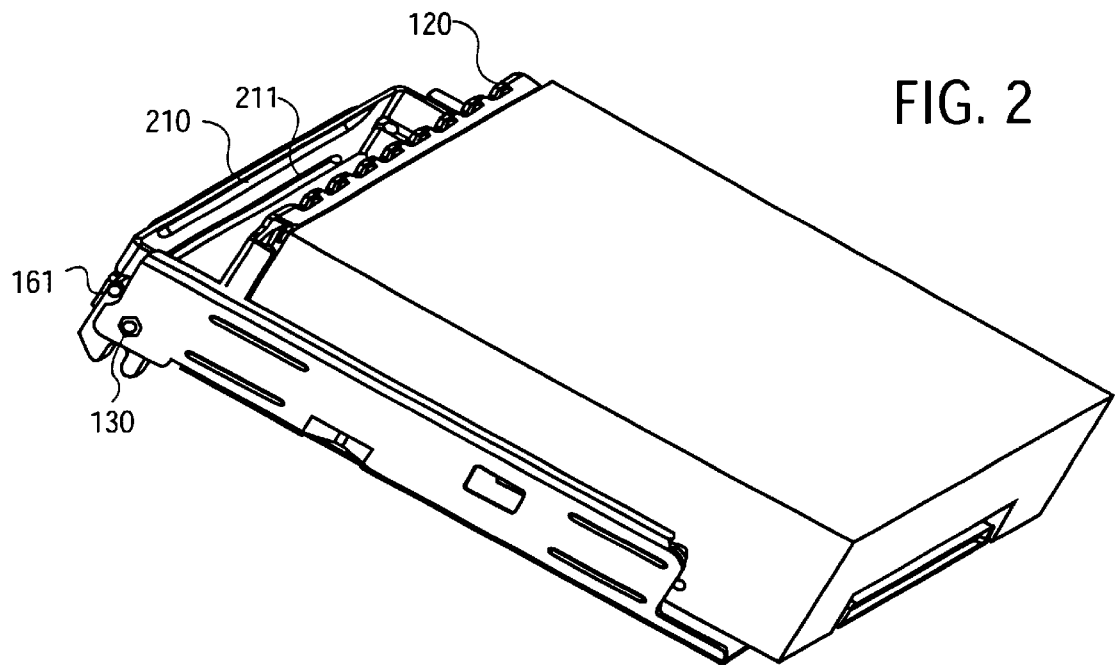
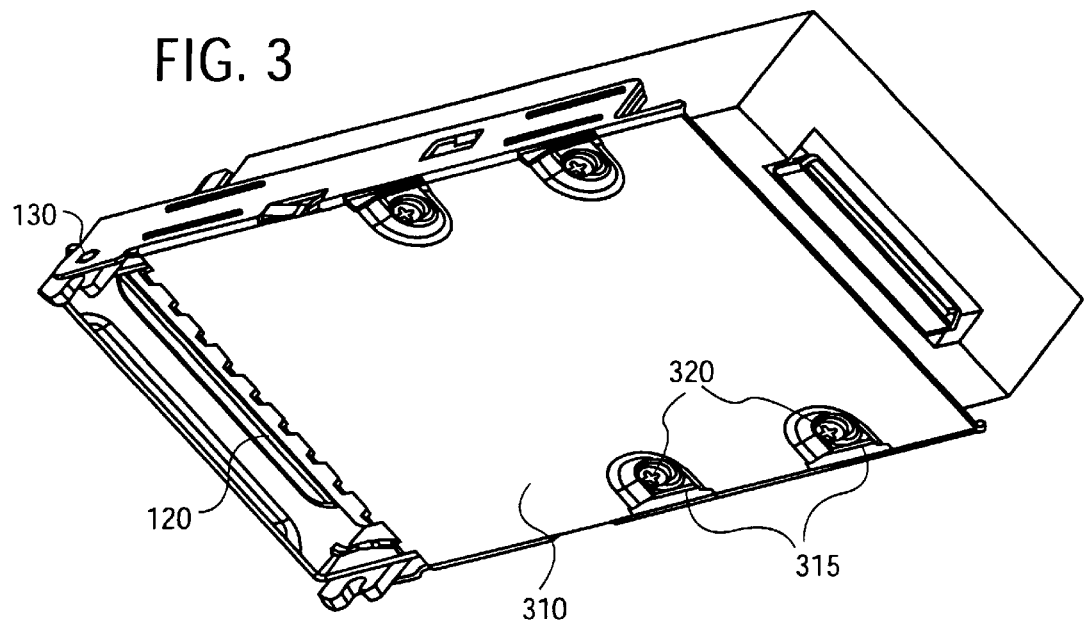

REMOVABLE CARRIER FOR HARD DISK DRIVE

FIELD OF THE INVENTION

The present invention relates to portable carriers for handling mounted devices. More particularly, the present invention relates to portable carriers and a chassis assembly for housing hot-plug connected hard disk drives.

BACKGROUND

Computer systems and information networks today require tremendous amounts of external data storage to satisfy user demands. To this end, mechanisms have been developed for housing multiple hard disk drives for storing large volumes of data. A recent advance in this field has been the introduction of "hot swappable" disk drives that may be added to or removed from a disk drive chassis or "cage" while power is being supplied to other disk drives in the cage. This configuration is also commonly referred to as "hot plug" connected disk drives.

Prior disk drive carriers for hot swappable disk drives suffered numerous disadvantages. These disadvantages included the problem of electromagnetic interference between adjacent hot-swappable hard disk drives. For example, when numerous hard drives are stacked within a single computer chassis, magnetic waves generated from one hard drive may interfere with the operation of another drive. This can result in undesirable effects ranging from a decrease in system performance to a complete system crash and corresponding loss of data.

In addition to interference from neighboring drives, there is also a risk of electromagnetic interference from the other internal components of the computer itself. As the speed at which integrated circuits within computer systems continues to rise, so does the problem of increased electromagnetic dissipation from those circuits. Accordingly, it would be desirable shield the hot-swappable hard drive from electromagnetic interference from other drives as well as from integrated circuits within the computer system. Conversely, it would be desirable to shield other components within the computer from potential electromagnetic interference dissipated by the hard drive itself.

Another disadvantage associated with prior disk drive carriers is that prior art drive carriers were susceptible to rotational vibrations caused by the drives they contained. Accordingly, hard drives became unseated too frequently during operation using prior art systems. As such, a more secure locking mechanism is needed to handle the increased vibrations resulting from the newer and faster hard drives.

Finally, as the speed and performance of hard drives continues to increase, so does the problem of increased heat dissipation. This problem is even more attenuated in systems with numerous hot-swappable hard drives located within a single computer chassis. Accordingly, it is desirable to provide an inexpensive and efficient method to alleviate the problem of increased hard drive heat dissipation.

SUMMARY

Disclosed is a hard disk drive carrier adapted to be housed in a disk drive chassis comprising a drive bay for receiving and holding a hard disk drive; an integrated locking mechanism including a handle for carrying the disk drive carrier and for providing a one-handed locking mechanism for locking and unlocking the disk drive carrier in the disk drive chassis; and an EMI shield fixedly coupled to the drive bay for providing a barrier to electromagnetic interference, the EMI shield covering a portion of the hard disk drive.

Also disclosed is a hard disk drive bay including opposing sidewalls for securing a hard disk drive into a chassis comprising a primary locking mechanism, the primary locking mechanism comprising first and second swing arms each pivotally coupled to said drive bay at a first pivot point and pivotally coupled to a handle at a second pivot point; and a secondary locking mechanism disposed on one or both of said opposing sidewalls, the secondary locking mechanism adapted to interface with corresponding locking elements disposed on the hard drive chassis.

BRIEF DESCRIPTION OF THE DRAWINGS

A preferred embodiment of the present invention is described herein with reference to the drawings wherein:

FIG. 2 illustrates one embodiment of the present invention from an elevated back view.

FIG. 3 illustrates one embodiment of the present invention from a lower back view.

DETAILED DESCRIPTION OF THE PREFERRED EMBODIMENT

FIGS. 1 through 6 of the drawings disclose various embodiments of the disk drive carrier for purposes of illustration only. One of ordinary skill in the art will readily recognize from the following discussion that alternative embodiments of the structures and methods illustrated herein may be employed without departing from the underlying principles of the invention. Throughout this detailed description, numerous specific details are set forth such as material types and disk drive protocols in order to provide a thorough understanding of the present invention. It will be appreciated by one having ordinary skill in the art, however, that the present invention may be practiced without such specific details. In other instances, well known structures and manufacturing techniques have not been described in detail in order to avoid obscuring the subject matter of the present invention.

Figure 1:
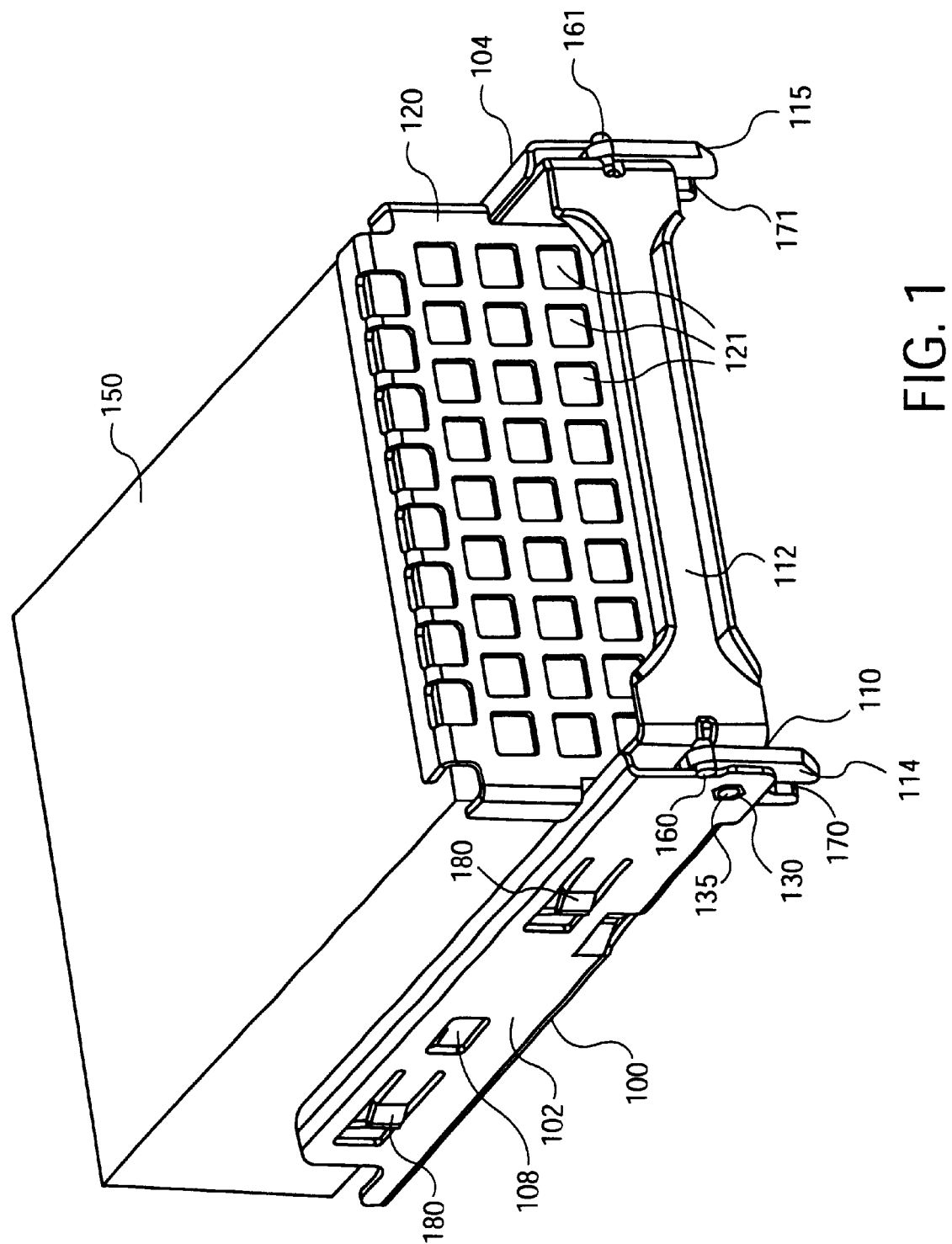
FIG. 1 illustrates one embodiment of the present invention from an elevated front view.
Figure 4:
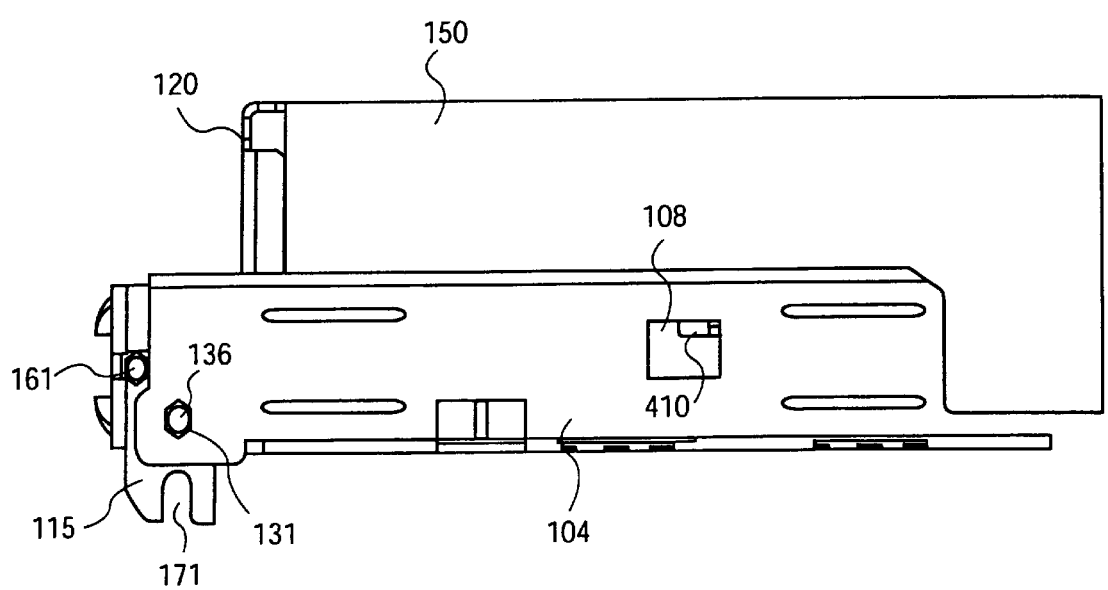
FIG. 4 illustrates one embodiment of the present invention from a direct side view.
Figure 5:
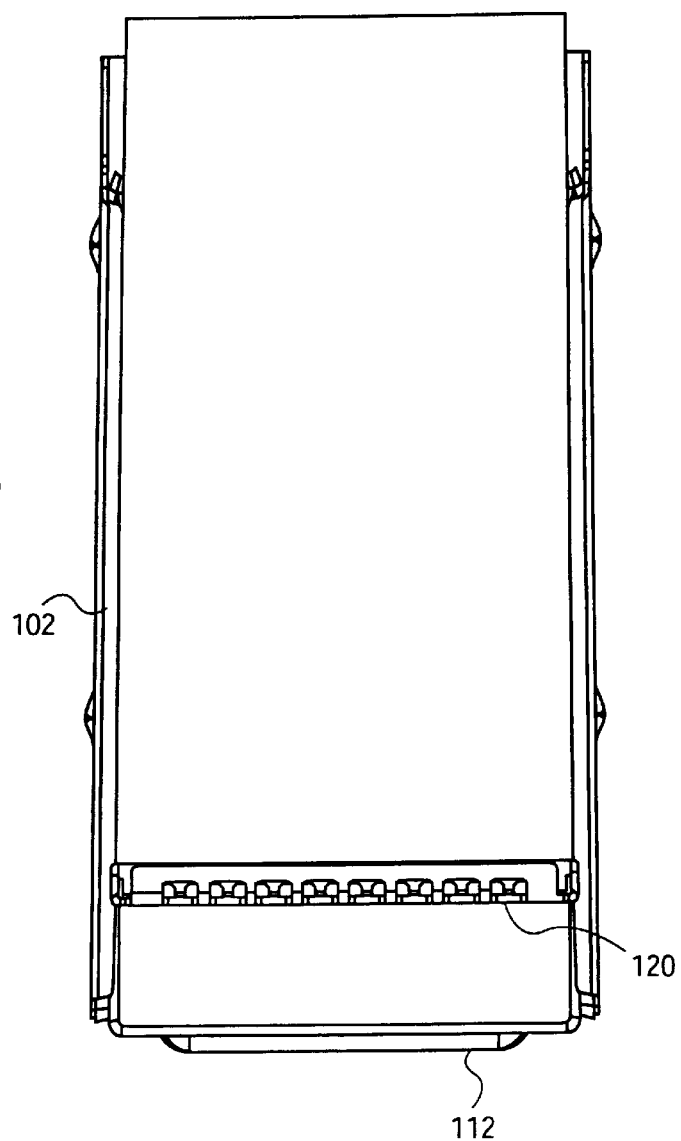
FIG. 5 illustrates one embodiment of the present invention from a direct top view.
Figure 6:
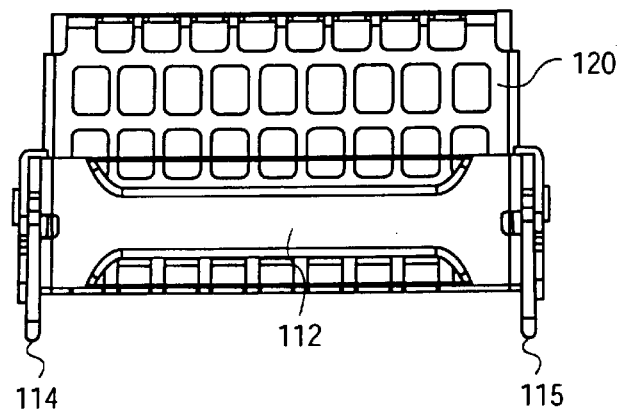
FIG. 6 illustrates one embodiment of the present invention from a direct side view.

FIGS. 1 through 6 illustrate six views of the hard drive carrier with a hard drive mounted in the carrier. FIG. 1 illustrates an elevated front view, FIG. 2 illustrates an elevated back view, and FIG. 3 illustrates a lower back view. FIGS. 4 through 6 illustrate the hard drive carrier from direct side, top and front views, respectively.

The hard drive carrier is generally comprised of a disk drive bay 100, a locking mechanism 110 which includes handle 112, and an electromagnetic interference (hereinafter "EMI") shield 120. The disk drive bay 100 comprises opposing sidewalls 102 and 104 and a floor 310 (see FIG. 3). The distal end of the bay 100 (i.e., the end opposite the EMI shield) is left unobstructed as it is the location for an interface connector for the hard disk drive to be mounted into the bay 100. The open end of the bay 100 may also include an optional slotted track (not shown) around the periphery of the interior which may be included for mounting an interface card if required.

In one embodiment, as can be seen in FIG. 3, a plurality of recessed holes 315 are formed in the floor 310 of the bay 100 (the holes are covered by screw heads in FIG. 3). The holes 315 provide an entryway through the floor 310 of the bay 100 for a plurality of screws 320. The holes 315 are positioned such that they match up with threads formed in the bottom of a disk drive 150 when the disk drive 150 is properly situated on the drive bay. The screws 320, when inserted through the holes 315, engage with the plurality of threads formed on the bottom of the hard disk drive 150.

In one embodiment, the floor 310 is comprised of metal to act as a heat sink and thereby aid in dissipating heat from the hard disk drive 150. In another embodiment, the floor 310 of the bay 100 is perforated with ventilation holes (not shown). These ventilation holes may further aid in allowing heat to dissipate from the hard drive 150.

Sidewall 104 of the disk drive carrier bay 100 includes a pocket 108 for a metal grounding clip. One or more apertures 410 (shown more clearly in FIG. 4) are provided for securing the ground clip to the bay sidewall 104. They also provide a mechanism for securing a hard disk drive 150 mounted within the bay 100 and for coupling the grounding clip to the hard drive's 150 electronics. This element provides a grounding path for the disk drive.

The inner portion of either sidewall 102, 104 of the disk drive bay 100 may include alignment flanges or ribs for providing a location mechanism for placing a hard disk drive 150 into the bay 100. In one embodiment, the ribs provide an alignment mechanism for the 4 inch width dimension associated with a conventional 3.5 inch hard disk drive form factor. The ribs also provide lateral support for shock mounted disk drives. In alternative embodiments, differing numbers of alignment flanges may be implemented. Cut into both sidewalls 102 and 104 of the drive carrier bay 100 are apertures 130 which accept engaging posts 135, 136 disposed on the locking mechanism 110.

The locking mechanism 110 of one embodiment of the hard disk drive carrier will now be described. The locking mechanism is generally comprised of a handle 112 and two swing arms 114,115. In one embodiment of the present invention, the handle 112 is made of a 20% glass filled polycarbonate material. Other materials may be suitable in alternative embodiments (e.g., metal). The grip portion of the handle 112 in the illustrated embodiment is a substantially rectangular member which increases in width at its ends. The handle 112 bends in towards the inner portion of the hard drive carrier at a substantially 90 degree angle. This portion of the handle interfaces with handle guides formed on the inner portions of each of the sidewalls 102 and 104. The guides in one embodiment steer the handle 112 in a direction substantially parallel with the length of the drive bay 100. The handle 112 is affixed to the two swing arms 114 and 115 at pivot points 160 and 161, respectively. Two inner rails 210 and 211 which protrude from the inner surface of the handle (i.e., the surface closest to the hard disk drive 150), provide for improved gripping of the handle when removing the drive carrier. In alternative embodiments, other geometries may be implemented for the grip portion of the handle 112 to suit aesthetic or other functional needs.

Each swing arm 114 and 115 is pivotally affixed to the handle 112 at pivot points 160 and 161, respectively, and is notched at the end with recessed grooves 170 and 171, respectively. As will be described below, these grooves are used to catch a cylindrical post 710 (see FIG. 7) provided in a multiple disk-drive cage for pivoting the locking mechanism 110 into a locking position within the overall disk cage. On the outer surface of each swing arm 114 and 115 there are provided protruding cylindrical engaging posts 135 and 136. These are used to pivotally interlock the handle mechanism 110 to the carrier bay 100 through apertures 130 and 131. Thus, the entire locking mechanism 110 (including the handle 112) is installed by flexing the handle 112 member and/or swing arms 114 and 115 to allow pivot posts 135 and 136 to enter apertures 130 and 131.

The illustrations in FIGS. 1 through 6 show the handle 112 in the position that would be considered the locked position. In this position, the portion of the handle 112 which is bent 90 degrees inward towards the drive carrier may interface with a lock on one or both of the sidewalls 102 and 104 in one embodiment of the drive carrier. For example, in the embodiment illustrated in FIGS. 1 through 6 a tab formed on the sidewalls 102 and 104 of the drive carrier may protrude inward and interface with a receptacle on the portion of the hard drive handle 112 to secure the handle in position.

Additionally, in the locked position, each of the recessed grooves 170 and 171 catch a cylindrical post 710 (see the embodiment of the drive chassis illustrated in FIG. 7) provided in a multiple disk-drive chassis for pivoting the locking mechanism 110 into a locking position within the overall disk cage. In one embodiment of the invention, the apertures 130 and 131 formed in the sidewalls 102 and 104 of the drive carrier are slightly larger in circumference than engaging posts 135 and 136 to allow the engaging posts a small amount of freedom of movement. In another embodiment, a thin film of firm but malleable material (e.g., rubber) may separate the outer surface of the engaging posts 135, 136 from the inner surface of the apertures 130, 131.

A secondary locking mechanism is included in one embodiment of the present invention. Particularly, as illustrated in FIG. 1, one or more tabs 180 disposed on sidewalls 102 and/or 104 will move out into one or more apertures 720 formed in the hard drive chassis illustrated in FIG. 7. Thus, the secondary locking mechanism of this embodiment firmly grips the sides of the drive chassis receptacle, thereby reducing the susceptibility of the disk drive to rotational vibrations generated within the drive or transmitted from neighboring drives.

Because the handle 112 is pivotally affixed to swing arms 114 and 115 at pivot points 160 and 161, respectively, and the swing arms 114 and 115 are pivotally affixed to the drive bay via apertures 130 and 131, as the handle 112 is pulled forward (i.e., away from the disk drive) with sufficient force, pivot points 160 and 161 will follow a substantially circular path around the point where engaging posts 135 and 136 interface with apertures 130 and 131, respectively. This motion will cause each of the recessed grooves 170 and 171 to push off of its respective cylindrical post 710 and, consequently, the drive carrier will move into an unlocked position.

As can be seen from FIGS. 1 though 6, when the locking mechanism 110 of the drive carrier is engaged with the drive carrier bay 100, the handle 112 provides a convenient mechanism for one-hand carrying of the disk drive mounted in the carrier. It can further be seen that the locking mechanism 110 of the present invention provides a useful system for a single-handed pivoting of the drive carrier locking mechanism implemented through recessed grooves 170 and 171 of the handle swing arms 114 and 115, respectively.

In one embodiment of the invention, an EMI shield 120 forms the front of the drive carrier as illustrated in FIGS. 1 through 6. The EMI shield 120 may either be fixedly connected to the drive bay 100 or may be formed from the same die as the base 310 of the drive bay 100 (rather than being produced separately and then fixedly attached). The EMI shield 120 may include a plurality of cutouts 121 which permit the flow of air for dissipating heat from the disk drive 150, while at the same time providing a barrier to the emission of electromagnetic interference generated by computer components or by the hard disk drive 150. In the illustrated embodiment, to prevent EMI leakage, portions of the periphery of the EMI shield 120 are bent inward and cover small potions of the top and sides of the attached disk drive 150. Neighboring drive carriers may contact one another to provide a continuous barrier to EMI.

Figure 7:
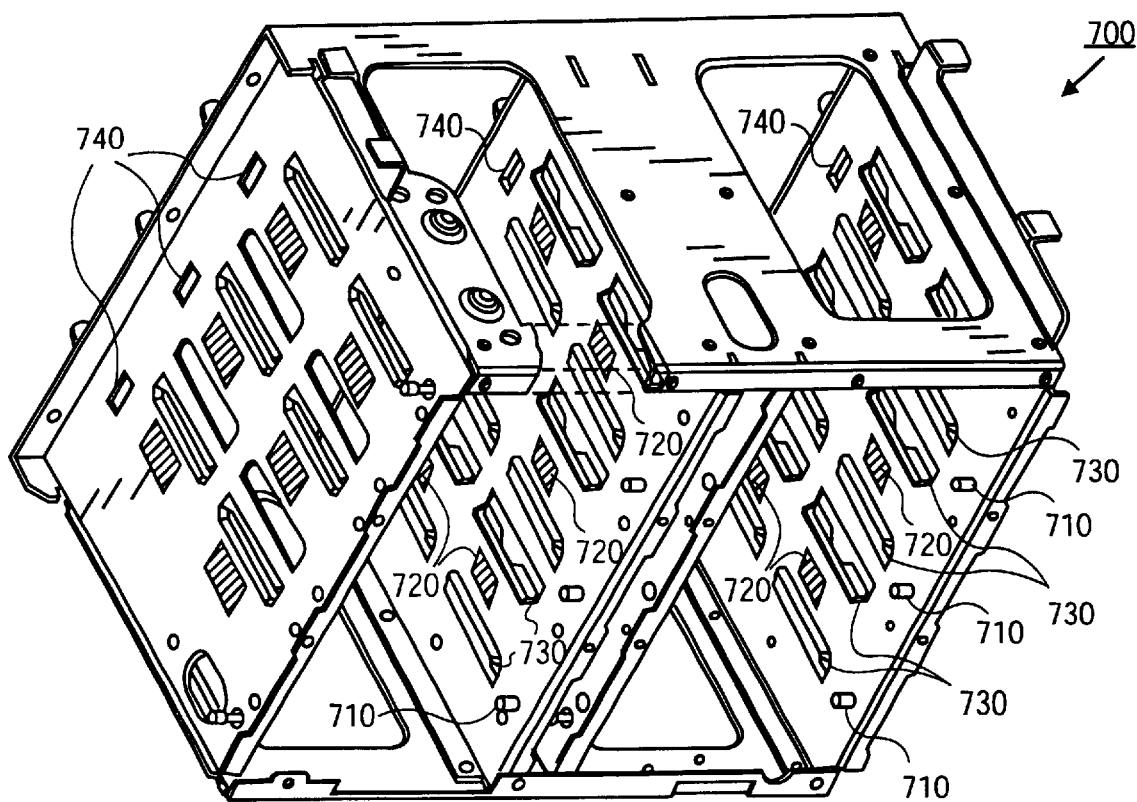
FIG. 7 illustrates one embodiment of a drive carrier chassis.

FIG. 7 illustrates one embodiment of a hard disk drive chassis 700 which may be used to receive one embodiment of the drive carrier of the present invention. While the present invention is directed toward a removable drive carrier, reference is made to the disk drive chassis of FIG. 7 to illustrate elements of a drive chassis required for taking advantage of the various aspects present invention. The disk drive chassis 700 illustrated in FIG. 7 is one embodiment suitable for receiving six disk drive carriers such as those described above with respect to the present invention.

The elements required to be implemented within disk drive chassis 700 may be the same for each of the receiving slots of the chassis 700. Accordingly, only one set of reference numbers will be used to indicate duplicated elements in the configuration. Of course, those of ordinary skill in the art will recognize that alternate configurations and different numbers of disk drive carriers may be housed by different chassis. Each receiving slot in the drive chassis comprises a receiving channel 730. At the entry portion of the drive chassis in front of each slot 730, there is implemented a cylindrical locking post 710. At the distal end of each drive slot 730 there may be a blocking protrusion 740 which retards the forward advance of a disk drive carrier being inserted into the drive channel. The backplane for the disk drive chassis would be affixed to the wall beyond the blocking protrusion 740. One embodiment of the chassis may also provide a conduction path for contacting with the grounding clip of the hard drive 150 for grounding the disk drive 150 when it is inserted into the chassis.

As was described above, the pivotal handle arms 114 and 115 of the locking mechanism 110 of the present invention are notched with recessed grooves 170 and 171. When a drive carrier is inserted into the drive cage, the handle is in the unlocked position. In the unlocked position, as the drive carrier nears full insertion into the cage, the notched recessed grooves 170 and 171 of the drive arms engage the cylindrical locking post affixed to the chassis. This causes the carrier handle to pivot until it reaches the locked position which coincides with a drive carrier reaching the blocking protrusion 740. In this manner, a simple integral locking mechanism is implemented in the drive carrier without excess complexity. Further, when a drive carrier is locked into the cage, it is simple to remove it by grasping the handle 112 of the locking mechanism 110 with a single hand and withdrawing it. Upon withdrawal, the handle arms 114 and 115 pivot to free the recessed grooves 170 and 171 from the cylindrical post 710 allowing for easy removal of the drive carrier.

Throughout this detailed description, numerous specific details are set forth such as material types and disk drive protocols, in order to provide a thorough understanding of the present invention. It will be appreciated by one having ordinary skill in the art that the present invention may be practiced without such specific details. In other instances, well known structures and manufacturing techniques have not been described in detail in order to avoid obscuring the subject matter of the present invention. Accordingly, the scope and spirit of the present invention should be judged in terms of the claims which follow.

What is claimed is:

1. A hard disk drive bay including opposing sidewalls for securing a hard disk drive into a hard drive chassis comprising:
   a primary locking mechanism comprising first and second swing arms each pivotally coupled to said drive bay at a first pivot point and pivotally coupled to a handle at a second pivot point, said first and second swing arms are pivotally coupled to said drive bay at each of said opposing sidewalls, said first and second swing arms including locking post engagement grooves notched therein for engaging with locking posts disposed on said hard drive chassis; and
   a secondary locking mechanism disposed on one or both of said opposing sidewalls, said secondary locking mechanism adapted to interface with corresponding locking elements disposed on said hard drive chassis.

2. The hard disk drive bay as claimed in claim 1 wherein said secondary locking mechanism disposed on said sidewalls includes tabs adapted move out into corresponding apertures disposed on said hard drive chassis.

3. The hard disk drive bay as claimed in claim 1 further including an EMI shield fixedly coupled to said hard disk drive bay.

4. The hard disk drive bay as claimed in claim 1 wherein said EMI shield comprises a metal plate with cutouts for permitting the flow of air to said hard drive.

5. The hard disk drive bay as claimed in claim 1 wherein said hard disk drive is fixedly coupled to said hard drive bay via screws inserted though recessed holes in said hard drive bay, said screws adapted to engage with matching threads disposed in said hard drive.

* * * * *